(12) United States Patent
Krishna

(10) Patent No.: US 8,887,233 B2
(45) Date of Patent: Nov. 11, 2014

(54) COOKIE-BASED ACCELERATION OF AN AUTHENTICATION PROTOCOL

(75) Inventor: Ravi Krishna, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 2353 days.

(21) Appl. No.: 11/102,363

(22) Filed: Apr. 8, 2005

(65) Prior Publication Data

US 2006/0230265 A1    Oct. 12, 2006

(51) Int. Cl.
*G06F 7/04* (2006.01)
*H04L 29/06* (2006.01)

(52) U.S. Cl.
CPC ............ *H04L 63/0281* (2013.01); *H04L 63/08* (2013.01)
USPC ................ 726/3; 726/2; 726/4; 726/5; 726/6; 713/168; 713/170

(58) Field of Classification Search
USPC .................................. 713/168, 170; 726/2–6
See application file for complete search history.

(56) References Cited

U.S. PATENT DOCUMENTS

| | | | |
|---|---|---|---|
| 6,324,648 B1 * | 11/2001 | Grantges, Jr. | 726/12 |
| 6,339,423 B1 * | 1/2002 | Sampson et al. | 715/854 |
| 6,345,303 B1 * | 2/2002 | Knauerhase et al. | 709/238 |
| 7,080,158 B1 * | 7/2006 | Squire | 709/245 |
| 7,305,701 B2 | 12/2007 | Brezak et al. | |
| 7,313,687 B2 | 12/2007 | Kaler et al. | |
| 7,322,040 B1 | 1/2008 | Olson et al. | |
| 7,343,398 B1 * | 3/2008 | Lownsbrough | 709/218 |
| 7,370,351 B1 * | 5/2008 | Ramachandran et al. | 726/8 |
| 7,478,434 B1 * | 1/2009 | Hinton et al. | 726/27 |
| 2002/0165971 A1 * | 11/2002 | Baron | 709/229 |
| 2003/0177351 A1 * | 9/2003 | Skingle | 713/156 |
| 2004/0117493 A1 * | 6/2004 | Bazot et al. | 709/229 |
| 2004/0123144 A1 * | 6/2004 | Chan et al. | 713/201 |
| 2005/0050364 A1 * | 3/2005 | Feng | 713/201 |
| 2008/0052775 A1 * | 2/2008 | Sandhu et al. | 726/14 |

* cited by examiner

*Primary Examiner* — Yin-Chen Shaw
(74) *Attorney, Agent, or Firm* — DeLizio Gilliam, PLLC

(57) ABSTRACT

A system uses a proxy server to authenticate a client with an authentication protocol that does not support caching. Rather than cache the client's authentication credentials, or access a client account manager for each network request generated by the client, the proxy server issues a cookie to an authenticated client and authenticate the client for subsequent request on the basis of the cookie.

25 Claims, 5 Drawing Sheets

COOKIE-BASED ACCELERATION OF AN AUTHENTICATION PROTOCOL

FIELD

Embodiments of the invention relate to network authentication, and more particularly to authentication of a client with a proxy server.

BACKGROUND

A proxy server is a device that acts as an intermediary between a client device and a server to a wide area network (e.g., the Internet). As an intermediary device, the proxy server may interconnect and/or provide communication between the client and the server. In addition to providing a communication path, proxy servers may be used to enforce security or perform other administrative procedures. A proxy server may also provide caching functionality to temporarily store content (e.g., network pages/sites, objects, etc.) that has been previously accessed from the wide area network. A proxy server with caching may be referred to as a cache/caching server or a web cache. A proxy server with caching may store web pages for websites recently "visited" by a client, or retrieved by the server for the client to access. The caching is typically used to manage bandwidth in a network and/or reduce the access time by the client for web browsing.

The proxy server may authenticate a client to verify the identity of the client prior to providing services to the client. Authenticating the client refers to a process in which a client device presents credentials, or certain values/keys, to the proxy. The proxy verifies the credentials with an authenticating procedure, which may involve passing credentials to an authenticating entity and/or service. The authenticating entity may be a device with which the proxy is communicatively coupled, for example, a domain controller that manages client/user accounts. The authentication process may be governed by an agreed-upon protocol, which defines what credentials will be sent, and how the authentication procedure will operate. In a system using a domain controller, the proxy server may receive credentials from a client and pass the credentials to the domain controller to verify the identity of the client.

NTLM (New Technology (NT) LAN (local area network) management) is an authentication protocol developed by Microsoft Corporation of Redmond, Wash. NTLM uses a three stage challenge and response procedure. In the first stage, a client sends a negotiation message to a server referred to as the "NTLMSSP negotiate" message, or simply NTLMSSP (NTLM Security Support Provider) negotiate. In the second stage, the server returns an eight-byte value referred to as the "NTLMSSP challenge" message, or simply the challenge. The challenge is specified to be eight bytes in NTLM, although a different number of bytes may be used in a different implementation, or a modified implementation of NTLM. The client uses the challenge provided and one or more other data items to generate a hash. Specifically, NTLMv1 uses the challenge and a password/passphrase of the client. NTLMv2 uses the challenge, the password/passphrase, and a random number. In the third stage, the client responds to the challenge by sending the hash result, referred to as the "NTLMSSP authentication" message, or simply NTLMSSP auth, to the server. The NTLMSSP auth may also be referred to as the response from the client. In the case of a proxy server, the proxy server forwards the challenge and the hash to the domain controller. The domain controller verifies the response and communicates the result back to the proxy server. If the result communicated back from the domain controller is that the hash matches a result generated at the domain controller, the proxy server authenticates the client.

With NTLM, the authentication process is expected to happen for each request by the client devices. When a system has many client devices, this may mean authentication is requested every time a client device generates a network content request. In an environment where a client device makes many requests, for example, because of browsing many different web pages, the burden on the domain controller may be considerable. As the number of clients increases, the load on the domain controller may be unreasonable for providing adequate, timely service to one or more clients. Thus, in NTLMv1, a proxy server may cache credentials of clients, to reduce the load on the domain controller. The proxy server itself may verify the cached credentials of a client, rather than passing the credentials to the domain controller for each request by the client for web services. Caching client credentials may significantly reduce the burden on the domain controller.

However, for NTLMv2, caching the credentials is ineffective because of the use of a random number in the hash. Because the random number is generated at each separate instance of authentication, the response by the client to the challenge should be expected to be different each time. For this reason, NTLMv2 may be considered an example of a non-cacheable protocol, because the protocol does not support caching of authentication credentials. The protocol may be considered non-cacheable because storing the authentication credentials for later reuse is ineffective at reducing the bandwidth and delay burden incurred by authenticating the client. Specifically for NTLMv2, even if the same challenge were sent each time, the client would be expected to return different hash results each time. Caching the credentials in the proxy server will therefore not operate to reduce the load on the domain controller, because the next hash cannot be expected to match a cached value. In traditional implementations, NTLMv2 can only be executed by authenticating the client with the domain controller for each access request.

Experience in implementing NTLM with cache servers shows that the load on the domain controller can become unworkable in NTLMv1 without credential caching. Because of variability within the authentication process, credential caching is ineffective in NTLMv2, potentially rendering an implementation of NTLMv2 in a cache server system/environment unworkable due to poor performance.

SUMMARY

A cache server may receive a request from a client for network services and authenticate the client with an authentication protocol that does not support caching. The cache server may then set a cookie for the authenticated client and authenticate the client for additional requests for network services on the basis of the cookie, and not through the standard authentication procedure of the authentication protocol.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
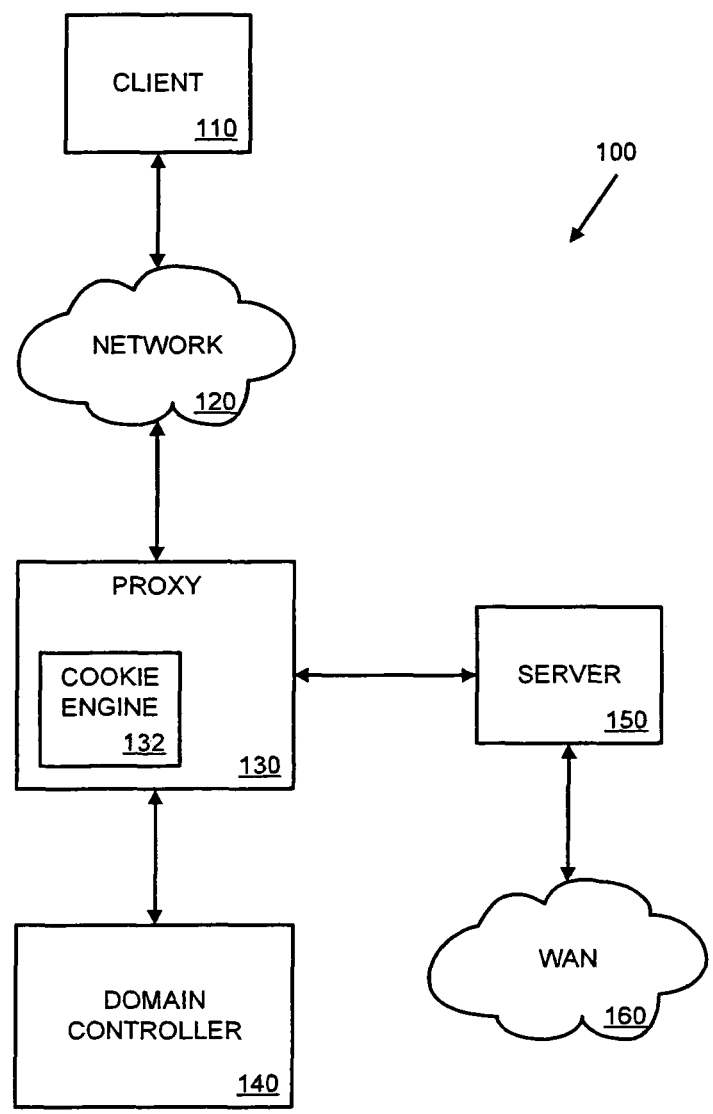
FIG. 1 is a block diagram of an embodiment of a network system with a proxy having a proxy server that includes a cookie engine.

Descriptions of certain details and implementations follow. Reference may be made herein to an "embodiment," which may be understood as describing a particular feature, structure, or characteristic included in at least one embodiment of the invention. Thus, the appearance of phrases such as "in one embodiment," or "in alternate an embodiment" may describe various embodiments and implementations of the invention, and may not necessarily all refer to the same embodiment.

In a system that authenticates clients with an NTLM-based protocol, particularly NTLMv2, or with another non-cacheable protocol, a proxy server, web cache, or equivalent, may potentially have to access the domain controller for each access request by a client. Access requests may include each new TCP (transmit control protocol) session/connection started by the client during a single web browsing session. However, several characteristics of a typical web browsing session can be observed. First, a user/client generally visits certain DNS (domain name service/server) domains more frequently than others. Second, when a user has loaded a particular site from a particular domain, the user may browse pages at that site (and within the domain) for several minutes, which is a long time as compared to the time incurred to execute a single instance of an authentication procedure. Browsing for extended periods may be especially true for news websites (e.g., cnn.com, slashdot.org), portal sites (e.g., MSN.com), and web-based mail programs (e.g., Google gmail, Yahoo! mail). Third, many sites have embedded objects, such as popup windows for displaying advertisements and banners. These embedded objects may belong to the domain of the website, but some browsers start additional TCP connections to download the embedded content. Observing these characteristics indicates that authenticating a client for a particular domain for a period of time could potentially reduce the burden of authenticating clients on a system.

Caching authentication credentials may be futile with NTLMv2 or another dynamic-credential authentication protocol. In one embodiment NTLM authentication is accelerated through the use of an authentication cookie set by a proxy server for a client. A cookie may be set for the client for each domain accessed by the client. In one embodiment the cache server sets the cookie after authenticating the client with the three-step NTLMv2 procedure. In one embodiment the cookie is set for the most generic domain to which the accessed web page/content belongs. As an example, suppose a client accesses "mail.yahoo.com." To access the site the user may need to be authenticated with the cache server via NTLMv2. To authenticate the client, the cache server may verify the authenticity of the client's credentials by contacting a domain controller. The domain controller may indicate a domain that is the most generic domain to which accessed content belongs. For example, the cache server may recognize ".yahoo.com" as the most generic domain for "mail.yahoo.com," and set a cookie for this domain for the authenticated client. The cookie can be formatted/configured to contain enough information to uniquely identify the user and an associated domain. The cookie may be formatted to reduce the possibility it can be forged or replayed. In one embodiment the cookie includes a configurable life time duration.

The user can have one cookie set by the proxy/cache server for each DNS domain visited. The cookie may be used in place of the three phases of NTLM authentication for the associated domain. Any requests for URLs (uniform resource locators) in a domain indicated in a cookie can be allowed on the basis of the cookie itself. In an implementation where a duration limit is used on a cookie, the cache server may not need to carry out domain controller transactions until the cookie expires. Thus, the use of the cookie may eliminate transactions with the domain controller until a point at which a user may switch to a different DNS domain and/or a cookie expires. As mentioned above, such events may be relatively infrequent compared to the frequency of visiting web pages within the same domain.

A context request (e.g., a hypertext transfer protocol (HTTP) GET request) resulting from embedded objects and/or popups in a website can also fall within the scope of authentication granted by the cookie. Such content can therefore be allowed by the cache server on the basis of the cookie, preventing the creation of extra load on the domain controller.

As mentioned above, the cookie can be formatted with sufficient information to identify a client and an associated scope of authentication (e.g., a domain, a time limit, etc.) granted by the cookie. A cookie is essentially a data structure, and may, in one example, include some or all of the following: cookie identification information, domain information, and user information. Note that a cookie may include more or less than what is described herein, and the details of an implementation of a cookie is to be understood as only an example, and is not limiting.

The cookie identification information may include a magic number to indicate that the data structure is a cookie, and not some other form of user credentials. The magic number may indicate to the cache server that a cookie is valid prior to decryption. The cookie identification information can include a version value/number. The version may indicate a format to be expected for the cookie (e.g., what information/data fields the cookie includes). The version may indicate a protocol to use for decryption (e.g., 3DES (triple data encryption standard), AES (advanced encryption standard), etc.).

The cookie may also contain a portion that includes domain and/or user information. In one embodiment the domain and/or user information is encrypted to provide extra security for the cookie. One way to implement secure encryption is to have the cache server generate a key that is known only to the cache server. The cookie can be encrypted and sent to the client, and the client may present the cookie back to the cache server. The cache server may decrypt the cookie with the key, and thus significantly reduce the risk of forgery of the cookie.

The user information portion may include another magic number to verify decryption in a case where encryption is employed. In one embodiment it may be assumed that if the magic number decrypts to an expected value, the encryption was performed properly. In another embodiment a hash value is generated and stored, and incoming cookies are hashed to compare against the expected value. The user information may include a username and/or other identifier of an authenticated user. The user information may include a domain, referring to a domain for which the cookie is valid. The domain may include a list of valid URLs or groups belonging to the domain. In one embodiment a list of groups can be too much to fit into the cookie, and the cache server may store them in an authentication cache. An entry in the authentication cache may be indexed based on, for example, a user name and a most generic domain.

The user information may include a client network address (e.g., an Internet Protocol (IP) address) for the client to which the cookie was issued. In this way, a user presenting a cookie must not only have a valid cookie, but have a network address that matches an address in the cookie. Even if a hacker were able to capture a valid cookie off the line, the hacker would have to change its own IP address to match the IP address of the client to gain access with the cookie. A destination address of the destination server may also be included.

The cookie may also include a timestamp, duration parameter, or other mechanism that can provide for expiration of the cookie. A timestamp may be a time (e.g., the time of epoch, meaning the moment the cache server set the cookie), a time period (e.g., a number of seconds since epoch, a number of seconds of life remaining, etc.), a count (e.g., a number of times the cookie has been used to compare against a threshold), etc. The timestamp may provide for the cookie to expire after a preset amount of time. Thus, referring to potential cookie capture by an attacker/hacker, all cookies can be configured to become useless at the configured expiration, which would limit the ability of an attacker to hijack a cookie to obtain network access.

FIG. 1 is a block diagram of an embodiment of a network system with a proxy having a proxy server having a cookie engine. System 100 includes multiple network devices where a cookie-based authentication procedure may be used. System 100 include client 110, which represents an electronic device that seeks access to wide area network (WAN) 160. A single client is shown in FIG. 1 for purposes of illustration, although a system in operation will generally include multiple clients. Client 110 may be a laptop or desktop computer, handheld computing device, etc. Client 110 may be coupled via network 120 to a proxy server (hereinafter simply "proxy") 130. Network 120 is not restricted to a particular type of network interconnection, but may be wired or wireless, and may implement one or more different, known, networking protocols. Proxy 130 provides network services to client 110, including forwarding requests to retrieve content from WAN 160. In one embodiment proxy 130 includes caching functionality, and may be referred to as a cache server or web cache. Proxy 130 may be part of a firewall, a gateway, or be an intermediary device.

Proxy servers may be used to provide authentication services to verify the identity of a user. Proxy 130 may thus authenticate client 110. Although multiple authentication techniques and/or protocols are known, non-caching protocols will be the primary focus herein. In particular, NTLMv2 is a non-cacheable protocol, because authentication credentials are different for each instance of authentication, rendering caching of the credentials useless. For ease of discussion and example, NTLMv2 may be referred to herein, although implementation of the principles and concepts described herein are not limited to any particular protocol. Proxy 130 includes cookie engine 132, which may enable proxy 130 to provide an authentication cookie to client 110. The providing of a cookie by proxy 130 may reduce a load on domain controller 140.

System 100 includes server 150, which interfaces WAN 160, which may represent the Internet, or some other wide area network. System 100 also includes domain controller 140, which provides DNS services to proxy 130, which includes providing domain names for requested network sites. Domain controller 140 also manages user accounts, and may be involved in NTLM authentication of client 110. Due to a potential burden on the network by having domain controller 140 authenticate client 110 for each network request generated, proxy 130 may attempt to cache the authentication credentials. Because this is not effective for NTLMv2, proxy 130 may accelerate the authentication process by the use of a proxy-issued cookie to client 110. Because the cookie is proxy-issued, the load on domain controller 140 can be reduced by proxy 130 handling authentication through the use of the cookie, instead of involving domain controller 140 in every instance of client authentication. There may be a distinction between a web cookie, as may be issued by a web site for a client to determine user preferences, etc., and the authentication cookie described herein to provide proxy 130 the ability to authenticate client 110 without having to verify the client's credentials with domain controller 140. The distinction may include the issuing entity, the content of the cookie, and/or the scope of the cookie.

Figure 2:
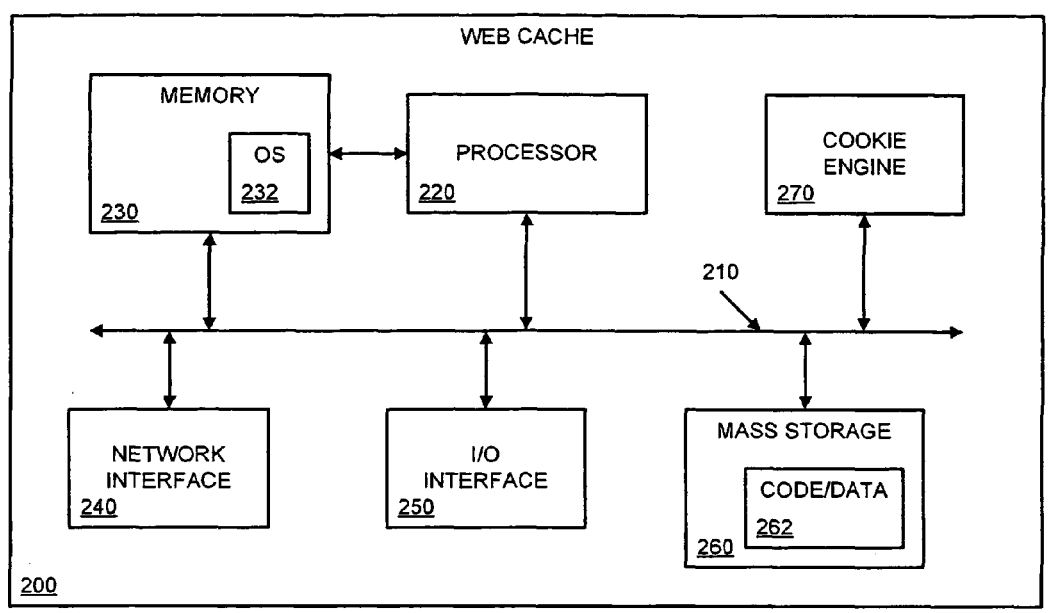
FIG. 2 is a block diagram of an embodiment of a cache server.

FIG. 2 is a block diagram of an embodiment of a cache server. Cache server 200 includes processor 220, which provides processing, operation management, and execution of instructions for cache server 200. Cache server 200 may be an example of proxy 130 of FIG. 1. Processor 220 may include any type of microprocessor, central processing unit (CPU), processing core, etc., to provide processing for cache server 200. Processor 220 controls the overall operation of cache server 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 230 may represents the main memory of cache server 200, and may provide temporary storage for code to be executed by the processor 220, or data values to be used in executing a routine. Memory 230 may include read-only memory (ROM), flash memory, one or more varieties of random access memory (RAM), or the like, or a combination of such devices. Memory 230 stores, among other things, an operating system (OS) 232 that provides one or more functions of cache server 200. OS 232 may include one or more functions for authentication and issuance of cookies, as described herein.

Processor 220 and memory 230 may be coupled to bus/bus system 210. Bus 210 is an abstraction that represents any one or more separate physical buses, communication lines/interfaces, and/or point-to-point connections, connected by appropriate bridges, adapters, and/or controllers. Therefore, bus 210 may include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Cache server 200 includes cookie engine 270 coupled to bus 210. Cookie engine 270 provides one or more functions related to determining if a client is authenticated, issuing a cookie, formatting the cookie, providing key values for the cookie, time stamping the cookie, determining the validity of the cookie, etc. One or more of these functions may be provided in an implementation of cookie engine 270. Additional functions not specifically mentioned here may also be included. Through cookie engine 270, cache server 200 can provide an authentication cookie to accelerate network access for a client by reducing a load on a domain controller that would authenticate the client in traditional systems.

Also coupled to bus 200 are network interface 240, one or more input/output (I/O) interface(s) 250, and one or more internal mass storage device(s) 260. Network interface 240 provides cache server the ability to communicate with remote devices (e.g., clients, servers) over one or more networks and may be, for example, an Ethernet adapter. Cache server may include separate interfaces for connecting to clients and to a server, or a domain controller. I/O interface 250 may include one or more interface components to connect cache server with other electronic equipment, for example, custom connections, blade adapters, etc., and/or may provide an interface to a system administrator (e.g., video, audio, and/or alphanumeric interface through I/O interface 250).

Mass storage 260 may be or include any conventional medium for storing large volumes of data in a non-volatile manner, such as one or more magnetic or optical based disks. Mass storage 260 may hold data/instructions in a persistent state (i.e., the value may be retained despite interruption of power to cache server 200). Mass storage 260 may be generically considered to be a "memory," although memory 240 is the executing or operating memory to provide instructions to processor 220. In one embodiment mass storage 260 includes code and/or data 262 that may be accessed and placed in memory 240 for execution by processor 220. Code/data 262 may include machine instructions related to authentication of clients, and setting and managing cookies. In one embodiment cookies may be stored in mass storage 260. Mass storage 262 may also store key values, magic numbers, hash results, etc., which may be used to compare against values in a cookie presented to cache server 200 by a client to verify the validity of the cookie and/or the user.

Cache server 200 may include hardware, software, and/or a combination of these to implement cookie engine 270. In a case where cookie engine is implemented at least partially in software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, cache server 200, performing various operations or executions described herein. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a hardware device (e.g., cache server 200) having code loaded on the device that the device may be able to execute when in operation. Thus, delivering a device with such code may be understood as providing the article of manufacture with such content described above. Furthermore, storing code on a database or other memory location and offering the code for download over a communication medium via a propagated signal may be understood as providing the article of manufacture with such content described above.

Figure 3:
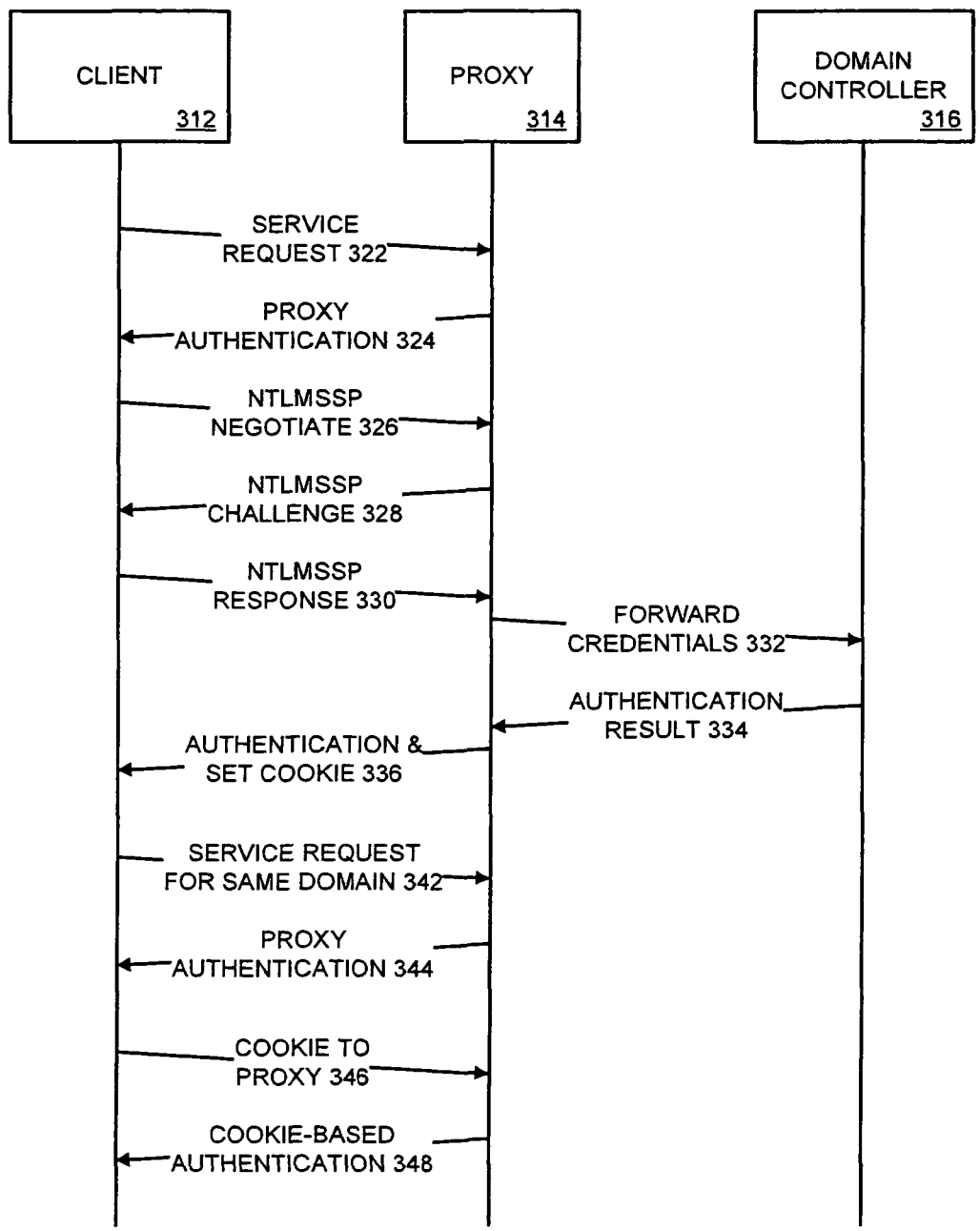
FIG. 3 is a block diagram of an embodiment of an authentication exchange between a client and a proxy.

FIG. 3 is a block diagram of an embodiment of an authentication exchange between a client and a proxy in accordance with the technique discussed herein. Client 312 may make a service request, 322, of proxy 314, which may be a web cache. The service request may include an HTTP GET request, to request content from a designated destination address. Proxy 314 may request authentication by client 312 with proxy 314, which may be performed by requesting proxy authentication, 324. To authenticate, client 312 sends an authentication negotiation message, NTLMSSP negotiate, 326, to request that proxy 314 authenticate client 312. Proxy 314 receives NTLMSSP negotiate, 326, and generates a challenge, NTLMSSP challenge, 328, which represents a value client 312 should use with a password and a random number to generate a hash. The hash and other accompanying credential/authentication information to be sent by client 312 to proxy 314 is referred to as the response, NTLMSSP response, 330.

Proxy 314 does not manage user accounts, and passes the credentials of client 312 to domain controller 316, as shown by forward credentials, 332. Passing the credentials and completing the authentication process with domain controller 316 may involve a delay for the client, and may generate a significant burden on domain controller 316, which may manage user accounts for hundreds or thousands of users, each one traditionally to be authenticated for each service request, 322, generated. Domain controller 316 issues an authentication result, 334, to proxy 314 to indicate to proxy 314 whether the authentication was successful or not. If the authentication was successful, proxy 314 may set a cookie and indicate the approved authentication to client 312, as shown by authentication and set cookie, 336. The cookie identifies client 312, and may indicate a domain for which the cookie is valid and/or a lifetime of the cookie.

Note that after receiving the cookie, client 312 may again make a service request for the same domain, 342, for example, if the user were browsing a website with embedded content. Proxy 314 would again request proxy authentication, 344, as traditional systems would provide. However, instead of providing a simple NTLMSSP negotiate, 326 message, the client could be configured to provide the cookie to the proxy, 346. Proxy 314 could issue a cookie-based authentication, 348, to client 312, on the basis of the cookie without having to access domain controller 316, and without requiring other credentials or process steps.

Figure 4:
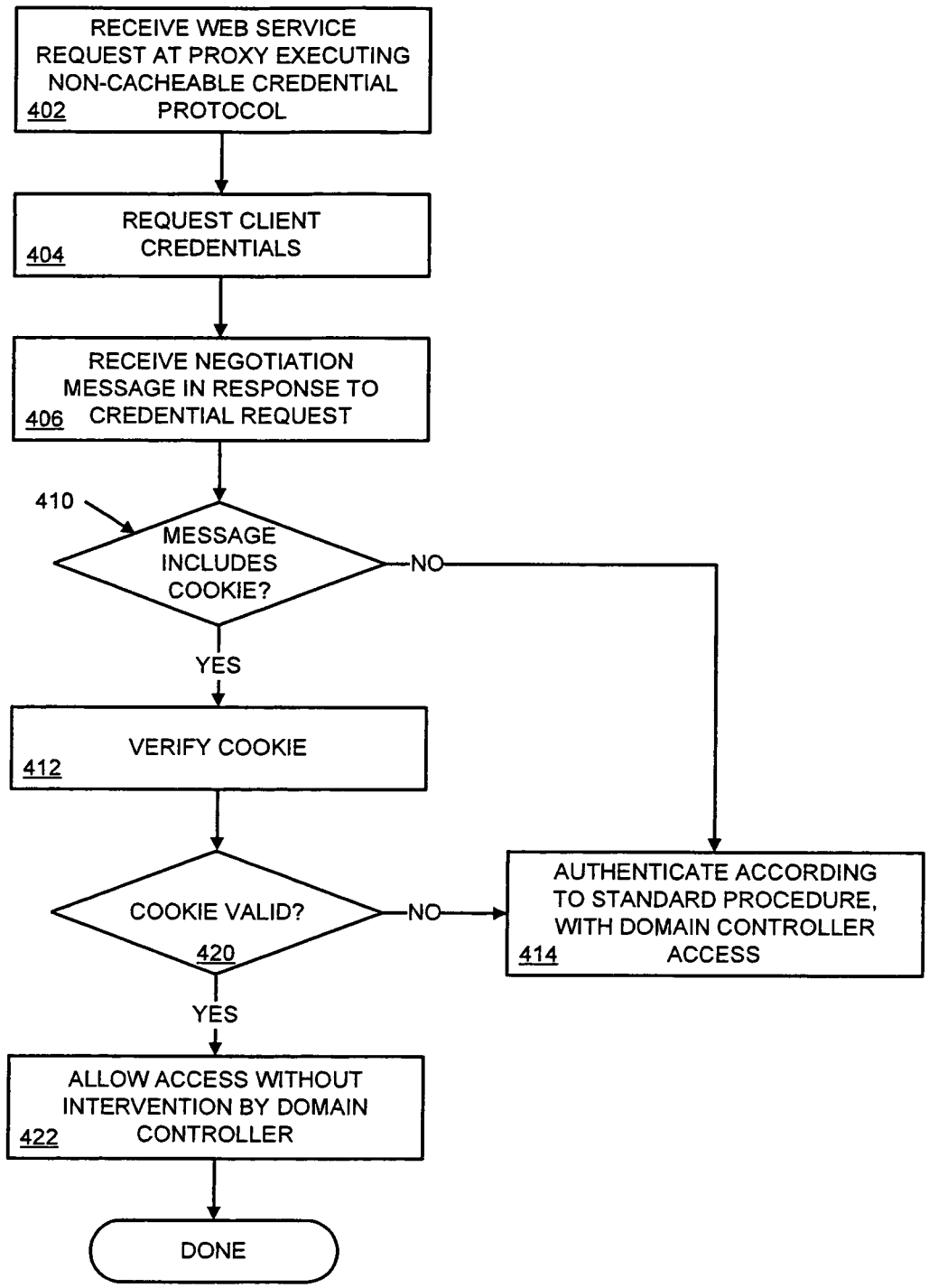
FIG. 4 is a flow diagram of an embodiment of a process of providing cookie-based services with a proxy.

FIG. 4 is a flow diagram of an embodiment of providing cookie-based services with a proxy in accordance with the technique discussed herein. The proxy receives a web service request according to a non-cacheable credential protocol, 402. The proxy requests the client's credentials to authenticate the client to be able to process the request, 404. The client then returns a negotiation message, or equivalent, in response to the credential request, 406. The negotiation message can be the protocol-based standard negotiation message in a case where the client has not been issued a cookie, or the negotiation message may represent a message in which the client could provide a cookie for authentication.

The proxy determines if the message includes a cookie, 410. Determining if the message includes a cookie could refer to accessing a field within the message to determine if a cookie ID or magic number are found to match with a database/table/list of cookies the proxy may have issued. If the message includes a cookie, the proxy will verify the cookie, 412, to determine that the cookie is still valid. A cookie may be invalid for one or more of a variety of reasons. Cookies may be associated with particular domains, and a cookie presented that references a different domain than the domain for which the request belongs would be improper. The cookie may be assigned an expiration, and a cookie that has reached expiration could be invalid. A cookie may specify a particular user address, and a user with a different address presenting the cookie would not be presenting a "valid" cookie, even though the cookie could be valid with respect to the client to which it was issued.

If the cookie is valid, 420, then the proxy can allow access without intervention by the domain controller, 422, and solely on the basis of the cookie (which indicates a previously successful authentication of the client). In this sense the proxy may be considered to bypass the normal authentication procedure in favor of authenticating the client with the cookie. For a cookie to be valid to authenticate the client, the cookie should properly set forth all validity fields, for example, refer to the correct domain, refer to the correct client, and be within a useful life of the cookie (i.e., it has not expired). If a cookie is not presented by the client, 410, or if the cookie is not valid, 420, the proxy may proceed to authenticate the client according to standard procedure, as indicated by a standards-based authentication protocol, with interaction with the domain controller, 414.

Figure 5:
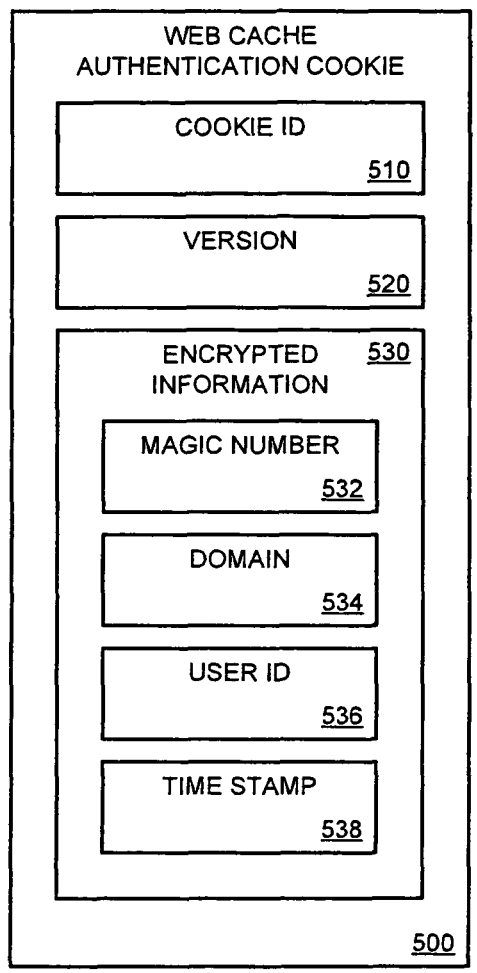
FIG. 5 is a block diagram of an embodiment of a cookie.

FIG. 5 is a block diagram of an embodiment of a cookie used in accordance with the technique discussed herein. Web cache authentication cookie 500, or simply cookie 500, may include various elements of information/data, which may also be referred to as fields. Some details of a potential cookie format are discussed above, and are presented here in relation to FIG. 5. Cookie 500 may include a cookie identifier (ID) 510, to indicate to the proxy server a valid cookie. The proxy server may issue multiple cookies, and assign each one an ID, or a magic number. Each assigned cookie may be listed, and a valid cookie list can be searched when a cookie is presented by a client to determine whether the cookie is a valid cookie issued by the proxy. Alternatively, a specific magic number may be assigned to all cookies issued by the proxy server. Other techniques may also be conceived, including issuing a particular cookie ID to one or more clients, and issuing different cookie ID's to others. Version 520 represents one or more items of data, or fields, to indicate a format, a cookie revision number, or other information that may be useful for the cache server to determine how to interpret a cookie presented by a client.

Encrypted information 530 may include one or more elements of client information. The information may be encrypted for security purposes to reduce the risk that sensitive information is passed on the network in an open format. Among other items, encrypted information 530 may include magic number 532. In one embodiment the magic number may provide a shorthand mechanism for the issuing proxy to determine that decryption of encrypted information 530 was successful. Rather than having to perform a hash and compare the results against an expected hash value, magic number 532 may be compared against a stored value to determine if they match. The matching value may be accessed from a table in a storage of the proxy on the basis, for example, of cookie ID 510, or it may be a value used for all cookies of a particular version 520, etc.

Encrypted information 530 may also include domain 534, which informs the proxy the domain to which the cookie applies. Thus, a client may present a cookie in response to an authentication request, but it should present the cookie corresponding to the domain for which the request belongs to gain access to the particular content requested. User ID 536 may include one or more elements to identify the user associated with cookie 500. For example, a username and/or a password/passphrase may identify a user/client. In one embodiment the IP address of the user is included in user ID 536. Including the IP address in user ID 536, and verifying the correct IP address may prevent another device from "stealing" the cookie and attempting to present it to gain network access. The proxy may disallow access for a requesting client for which the IP address of user ID 536 does not match. Timestamp 538 to provide the ability for the life of cookie 500 to be terminated, for example, after a time period, or a certain number of uses. Placing a time limit on cookie 500 may reduce the impact that may occur from having a cookie stolen, if one were in fact obtained and used by an imposter.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for authentication comprising:
receiving a request from a client for a network service at a cache server;
authenticating the client at the cache server for the request according to a non-cacheable authentication protocol, the non-cacheable authentication protocol specifying that the client be authenticated for each separate request with client credentials and additional, non-cacheable information that is invalid for authentication after use, which prevents caching the information necessary to authenticate the client for subsequent requests, the authenticating including passing client credentials to a client database manager;
setting a cookie at the cache server for the authenticated client to access a domain of the network service;
receiving a subsequent request from the client for an additional network service of the domain at the cache server, the request including the cookie; and
authenticating the client at the cache server for the subsequent request with the cookie by bypassing the non-cacheable authentication protocol, and without passing client credentials to the client database manager.

2. A method according to claim 1, wherein the cookie includes a lifespan duration, and wherein authenticating the client for the subsequent request further comprises determining that the cookie has not exceeded the duration of its lifespan.

3. A method according to claim 2, wherein the lifespan duration comprises a timestamp field to indicate the duration.

4. A method according to claim 3, wherein the timestamp field comprises a value indicating a number of seconds since an epoch of the cookie that indicates a time of issuance of the cookie by the cache server.

5. A method according to claim 1, wherein authenticating the client for the subsequent request with the cookie further comprises verifying the cookie for validity.

6. A method according to claim 5, wherein verifying the cookie for validity comprises determining if the client is a client specified in a client identification field of the cookie.

7. A method according to claim 6, wherein determining that the client is the client specified further comprises determining that an Internet Protocol (IP) address of the client matches an IP address specified in the client identification field of the cookie.

8. A method according to claim 5, wherein verifying the cookie for validity comprises determining if the subsequent request is for content within a domain specified in a field of the cookie.

9. A network device comprising:
a network interface to connect to a network to couple to a client device and a domain controller;

a cache to cache network content accessed from the network by the client;
a memory having instructions to define operations including authenticating the client device for a request by the client for network services according to an authentication procedure of an authentication protocol to allow network access to the client, the non-cacheable authentication protocol specifying that the client be authenticated for each separate request with client credentials and additional, non-cacheable information that is invalid for authentication after use, which prevents caching the information necessary to authenticate the client for subsequent network access, the authenticating including passing client credentials to a client database manager, issuing a cookie to the authenticated client in response to the request to access a domain of the network service, and bypassing the authentication procedure of the protocol by authenticating the client at the network device with the cookie for subsequent network access without passing client credentials to the domain controller; and
a processor to execute the instructions.

10. A network device according to claim 9, wherein the authentication protocol comprises an NTUv1v2 (New Technology LAN (local area network) management, version 2)-based authentication protocol.

11. A network device according to claim 9, wherein the cookie specifies a particular domain associated with the cookie, for which the client can be authenticated with the cookie for subsequent access to content within the domain.

12. A network device according to claim 11, wherein the particular domain comprises a most generic domain to which the content belongs.

13. A network device according to claim 11, wherein the network device is a network cache server.

14. A method comprising:
receiving a client request for an access to content within a part of a network domain;
authenticating the client for the client request with a non-cacheable, challenge-based authentication protocol at a proxy server, the non-cacheable authentication protocol specifying that the client be authenticated for each separate client request with client credentials and additional, non-cacheable information that is invalid for authentication after use, which prevents caching the information necessary to authenticate the client for subsequent access to the domain, the authenticating including the proxy server accessing a domain controller;
issuing a cookie for the entire network domain from the proxy server to the authenticated client; and
authenticating the client at the proxy server with the cookie for subsequent access to the domain by bypassing the non-cacheable authentication protocol and not sending client credentials to the domain controller.

15. A method according to claim 14, wherein the non-cacheable, challenge-based authentication protocol comprises an authentication protocol based on the NTLM (New Technology LAN (local area network) management) challenge-response authentication procedure.

16. A method according to claim 14, wherein the cookie includes one or more fields of information that are encrypted.

17. A method according to claim 16, wherein the cookie includes a non-encrypted field having a cookie identifier to indicate a valid cookie to the proxy server prior to decryption of the cookie by the proxy server.

18. A method according to claim 16, wherein the cookie includes an encrypted field having a value, the proxy server to assume that decryption of the cookie was successful if the decrypted value matches an expected value stored on the proxy server.

19. A method according to claim 16, wherein the one or more fields comprises all user and domain information specified in the cookie.

20. A non-transitory machine readable medium having stored thereon program code to:
receive a client request for an access to content within a part of a network domain;
authenticate the client for the client request for the entire network domain with a non-cacheable, challenge-based authentication protocol at a proxy server, the non-cacheable authentication protocol specifying that the client be authenticated for each separate client request with client credentials and additional, non-cacheable information that is invalid for authentication after use, which prevents caching the information necessary to authenticate the client for subsequent access to the domain, the authenticating including the proxy server accessing a domain controller;
issue a cookie for the entire network domain from the proxy server to the authenticated client; and
authenticate the client at the proxy server with the cookie for subsequent access to the domain by bypassing the non-cacheable authentication protocol and not sending client credentials to the domain controller.

21. The non-transitory machine readable medium of claim 20, wherein the non-cacheable, challenge-based authentication protocol comprises an authentication protocol based on the NTLM (New Technology LAN (local area network) management) challenge-response authentication procedure.

22. The non-transitory machine readable medium of claim 20, wherein the cookie specifies the network domain and the client for which the cookie can be used for authentication.

23. A system comprising:
a domain controller to manage a client account database, the client account database to store values associated with client credentials, the domain controller to verify client credentials with the values stored in the client account database to verify an identity of a client; and
a caching server coupled to the domain controller, to receive from a client device having a network address a network service request for access to content within a part of a network domain, pass credentials obtained from the client to the domain controller to authenticate the client for the network service request for the entire network domain with a non-cacheable, challenge-based authentication protocol at the caching server, the non-cacheable, challenge-based authentication protocol specifying that the client be authenticated for each separate network service request with client credentials and additional, non-cacheable information that is invalid for authentication after use, which prevents caching the information necessary to authenticate the client for subsequent access to the domain, issue a cookie to the client for the entire network domain from the caching server to indicate the client has been authenticated, and authenticate the client at the caching server for a subsequent network service request on the basis of the cookie by bypassing the non-cacheable, challenge-based authentication protocol and not sending client credentials to the domain controller.

24. A system according to claim 23, wherein the network service request comprises an HTTP (HyperText Transfer Protocol) request for network content.

25. A system according to claim 24, wherein the caching server to authenticate the client for the subsequent network service request comprises the caching server to determine if the cookie includes a valid cookie identifier and a client IP address that matches the network address of the client, and if the cookie has not expired.

\* \* \* \* \*